United States Patent [19]

Pressiat

[11] 4,151,595
[45] Apr. 24, 1979

[54] SYSTEM FOR CONTROLLING GROUND MOVEMENTS ON AIRFIELDS

[75] Inventor: Robert Pressiat, Paris, France

[73] Assignee: Thomson-CSF, Paris, France

[21] Appl. No.: 842,278

[22] Filed: Oct. 14, 1977

[30] Foreign Application Priority Data

Oct. 19, 1976 [FR] France .................................. 76 31353

[51] Int. Cl.² .......................... G08G 5/08; G06F 15/48
[52] U.S. Cl. ..................................... 364/439; 340/24; 340/26; 340/38 R; 364/438; 364/424
[58] Field of Search .............. 364/436, 438, 439, 440; 340/22, 24, 31 R, 38 R, 26, 27

[56] References Cited

U.S. PATENT DOCUMENTS

| | | | |
|---|---|---|---|
| 2,972,742 | 2/1961 | Ross | 364/439 |
| 3,383,652 | 5/1968 | Charot et al. | 340/27 R |
| 3,706,969 | 12/1972 | Paredes | 340/26 |
| 3,919,686 | 11/1975 | Narbaits-Jaureguy et al. | 340/38 |
| 3,971,025 | 7/1976 | Levine | 340/26 |
| 4,023,017 | 5/1977 | Ceseri | 364/438 |

*Primary Examiner*—Felix D. Gruber
*Attorney, Agent, or Firm*—Oblon, Fisher, Spivak, McClelland & Maier

[57] ABSTRACT

The system enables aircraft movements on runways and taxiways to be guided and a corresponding ground traffic to be controlled. It comprises sensors for detecting pressure variations and which are distributed at known intervals along the routes, each sensor having four linear arms arranged in pairs on both sides of the axis of the route in such a way that the items of data corresponding to the respective times at which the lateral wheels of the aircraft cross them enable, by means of a simple calculation performed by electronic processing of the detected signals, guidance and control instructions to be produced which include: heading deviation ($\Delta$ C), speed (V) together with its direction, and lateral deviation ($\Delta$ E) and in addition, instructions or orders such as changes of heading, changes of speed, emergency stops and runway turn-offs.

6 Claims, 8 Drawing Figures

FIG_2

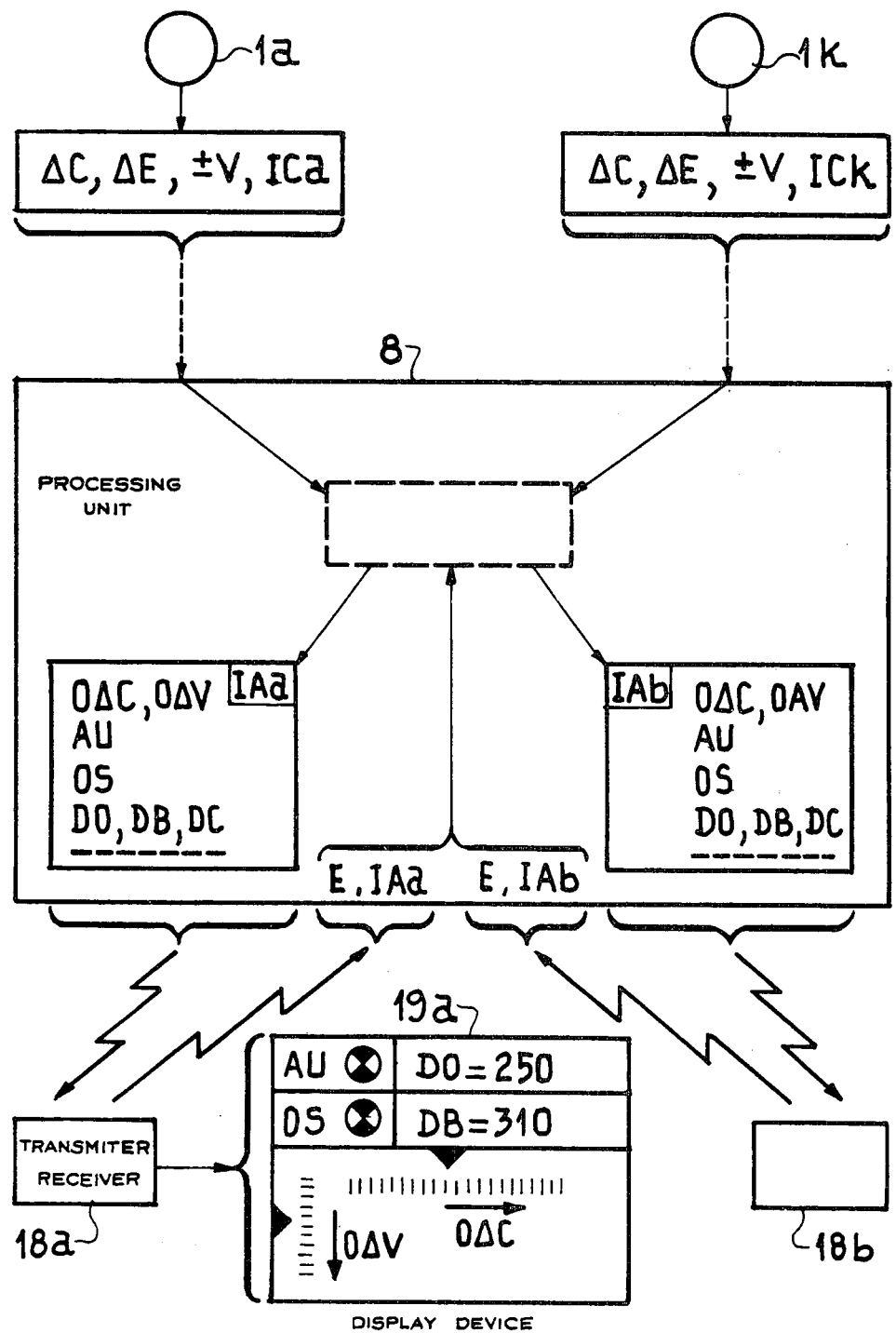

SYSTEM FOR CONTROLLING GROUND MOVEMENTS ON AIRFIELDS

BACKGROUND OF THE INVENTION

The present invention relates to a system for controlling ground movement on airfields. The control which is exerted is applied chiefly to aircraft maneuvering on runways and access ways from their parking area to take-off or conversely from landing to a parking area, but it is understood that other moving vehicles using these routes may likewise be controlled by the system.

The control system is intended to detect and transmit information required for supervising the routes along which movement takes place, to allow significant variables to be calculated on the basis of this information, and to allow these variables to be processed and then transmitted for use, which transmission may take place on the one hand to a display or indicator panel and on the other hand to the moving vehicles being controlled to allow orders and information to be displayed for the pilots.

The system is intended to assist in guiding aircraft on runways so that their movement takes place along the centerline of the runway, which may be a problem in the case of aircraft of wide track or span. It also enables control to be exerted on the traffic resulting from the various vehicles which are moving about on the routes, runways and access ways of the airfield which are being monitored, and thus any possibility of collision to be prevented, while at the same time permitting a high density of traffic as a result of this control.

It is known to determine the path of aircraft with respect to the ground during the taking off or the landing periods, by utilizing a multiplicity of detection elements disposed at known intervals from one another and extending in a direction perpendicular to that of the track, each detection element comprising a flexible strip and detecting circuits at each end to convert to electric signals the pressure variations caused as the aircraft passes over the strip. The phase of the detected signals are compared to measure the lateral deviation of the aircraft. Computing means are further provided to compute other parameters, in particular, the speed of the aircraft.

SUMMARY OF THE INVENTION

According to the invention there is provided a system for controlling ground movement on airfields comprising: on the ground, sensors for detecting pressure variations and which are distributed at known intervals along the routes of movement, each sensor comprising four linear elements forming four arms disposed two by two on both sides of the axis of the route for producing four items of data A, B, C, D corresponding to the respective times at which the lateral wheels of a vehicle pass across the said arms; calculating means for calculating, from the said items of data, parameters which represent the angular deviation $\Delta C$ of the heading of the vehicle and the lateral deviation $\Delta E$ of the vehicle from the axis of the route of movement, and its speed V of movement and the sign SR thereof; connecting and control means for transmitting the said items of data to the calculating means and for controlling the sensors; processing and transmitter/receiver means for generating, from the said parameters and from vehicle identification data IA, E, operating signals for display and ground control of the traffic; and on board the vehicles, transmitter/-receivers and display means for transmitting the said identifying data and for receiving operating signals to display.

BRIEF DESCRIPTION OF THE DRAWINGS

The invention will now be further described with reference to the accompanying drawings in which:

FIG. 8 is a block diagram relating to the processing of the variables.

DESCRIPTION OF THE PREFERRED EMBODIMENTS

Figure 1:
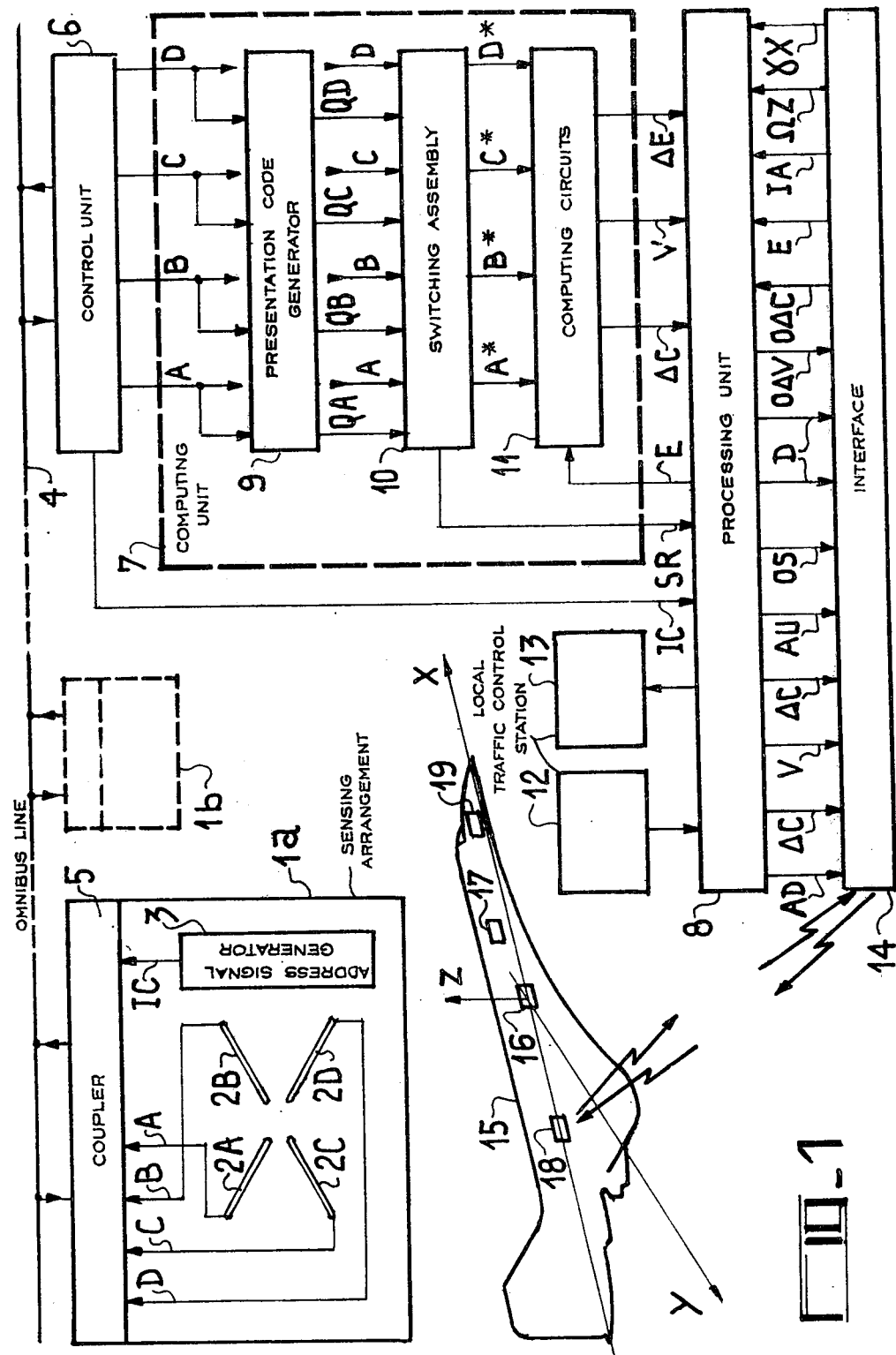
FIG. 1 is a general diagram of the system.

Referring to the general diagram in FIG. 1, the system comprises a ground apparatus, a transmitting and receiving interface for transmissions to and from the moving vehicles by hertzian wave link, and apparatus on board the moving vehicles.

The ground apparatus includes pressure sensing arrangements $1a$, $1b$, etc., which are disposed along the runways and access ways which form the routes to be monitored. These sensing arrangements are preferably laid out at regular intervals along the linear sections of the routes but their spacing is determined taking into consideration, the function of the section of route, (runway, access way etc.), the kind of traffic anticipated, and the proximity of intersections and bends, and because of this may vary. The variation in the spacing may, for example, be between 0.5 and 10 times the width of the route as dictated by the determining factors mentioned.

When a vehicle passes, each sensor is designed to receive timed information which, when subsequently processed, enables parameters to be worked out which are significant for the movement of the vehicle, these parameters being: the speed of movement V, the direction of movement SR, the heading deviation $\Delta C$ or the angle between the longitudinal axis of the vehicle and the axis of the route in question, and the lateral deviation $\Delta E$ as defined by the displacement of the axis of the aircraft from the center of the sensor, which is situated on the axis of the route. Each sensor comprises a group of four individual sensing elements which form four linear arms 2A, 2B, 2C and 2D which are arranged two by two on both sides of the axis of the route. The pattern, which is shown diagrammatically in sensor $1a$ in the Figure, corresponds to that described below in detail with reference to the next FIGS. 2 and 3. The individual sensing elements are sensitive to changes in pressure caused by the passage of the undercarriage of the vehicle and they produce electrical signals at the corresponding times. The dimension and disposal of the arms are determined to obtain four signals called A, B, C and D produced by the passage of the lateral wheels. In addition, a device 3 produces an identifying or address signal IC for the sensor $1a$ in question. These signals are transmitted to a calculating and processing assembly which is common to all the sensors.

For transmission, use is made of a shared digital transmission line 4 termed on omnibus line, along which the information from the sensors flows, and of coupling means between the sensors and the line and between the line and the calculating and processing assembly. Each sensor is thus equipped with a coupler, as is indicated at 5 in the case of sensor 1a. The line 4 is controlled by a control unit indicated at 6 which is assumed to include means for coupling between itself and the line. The transmission means 4, 5, 6 may operate in various ways. A logic unit for interrogation and response is designed in such a way that the data transmitted by the sensors to the control unit represent highly reliable and up-to-date information. This result is achieved by using known control techniques based on checking, redundancy, multiple interrogation, compatibility and probability etc. The control unit 6 includes logic units which are designed for the aforementioned checks and to transmit the items of data A, B, C, D and IC to be processed at any given time on a time sharing basis to the downstream circuits, which in the diagram of FIG. 1 consist of a calculating unit 7 followed by a processing unit 8.

From the received data A, B, C and D, the calculating unit 7 produces the significant parameters V, $\Delta C$, $\Delta E$, and SR defined above. In the embodiment described, the unit 7 includes a circuit 9 for generating presentation codes (FIG. 5), a switching circuit 10 (FIG. 6) and a calculating circuit 11 (FIG. 7). These circuits and their functions will be described at a later stage.

From the significant parameters the sensor-identifying signals IC and other incoming data, the processing unit 8 produces the data which is on the one hand to be transmitted to the moving vehicles controlled by the system and on the other hand to a local traffic-control station. In the diagram of FIG. 1 this station is represented by the block 12, which symbolises external means which supply to the processing circuits 8 data relating to runway and parking area allotment instructions, and by the receiver block 13, which preferably represents indicator means, such as a panel for displaying ground traffic on reception of data including the identity or moving vehicles and their significant parameter.

The other data received by the processing unit 8 comes from the moving vehicles being controlled and includes, for each vehicle, information IA on its identity and a value E for half the track of the lateral wheels of its undercarriage. In the case of an aircraft as shown at 15, longitudinal acceleration $\gamma X$ given by an accelerometer 16 and rate of roll (turn) $\Omega Z$ given by a rate-of-turn gyro 17 may also be provided.

Communications with the vehicles are carried on by the hertzian transmission of digital data by means of a transmitter/receiver interface which is indicated at 14 on the ground and at 18 on the moving vehicle 15 being monitored.

From the signals coming from each sensor, the processing unit 8 works out change-of-heading instructions O$\Delta$C for the moving vehicle and information useful for the pilot such as heading deviation $\Delta C$, speed V, lateral deviation $\Delta E$, etc. This information may be displayed on a device 19 arranged for this purpose.

Using all the speed and direction of movement information arriving from the various sensors, and with the knowledge of the longitudinal acceleration of certain moving vehicles, orders to change speed may be produced and transmitted to the moving vehicles. If for example two aircraft are taxying one behind the other at a distance which is too close in view of their respective speeds, orders O$\Delta$V to change speed may be transmitted to one or both of them in order to increase the distance separating them. Similarly, orders AU for an emergency stop and orders OS to turn off onto a designated taxi-way may be transmitted, as also may useful information on the speed of movement V and on the distances D from the end of the runway, to the indicated turnoff, to the parking point or to the closest obstacle.

The roll rate $\Omega Z$, the longitudinal acceleration $\gamma X$ and the identification data IA and other useful information such as landing, taking-off, distance between left and right undercarriage units, etc. may also be transmitted from the moving aircraft by the hertzian transmission of digital data.

The panel 13 for displaying the traffic reproduces all the information needed by the person responsible for operating the system, viz the runways and taxiways and their positions, the identity data, speed and direction of moving vehicles and special instructions, the turnoffs and parking areas assigned, emergency stops, and other useful information such as on air and ground queueing.

The data is transmitted automatically to the moving vehicles by hertzian-wave means. Only the moving vehicle to which the received data is addressed processes the message by virtue of the fact that the address AD of the recepient is included. Conversely, each moving vehicle transmits to the processing unit the data which is specific to it, in particular the aforesaid items IA and E.

As well as the interface 14, 18 for hertzian-wave transmission which is responsible for transmission, reception and the identification of addresses, the display system 19, which may be of the head-up or head-down, collimating, cathode ray tube, or plasma panel kind, enables movement orders to be displayed, these being orders O$\Delta$C to change heading and orders O$\Delta$V to change speed, and also information on heading deviation $\Delta V$, axial deviation $\Delta E$, speed V, emergency stops AU, turnoffs OS and distances D.

Figure 2:
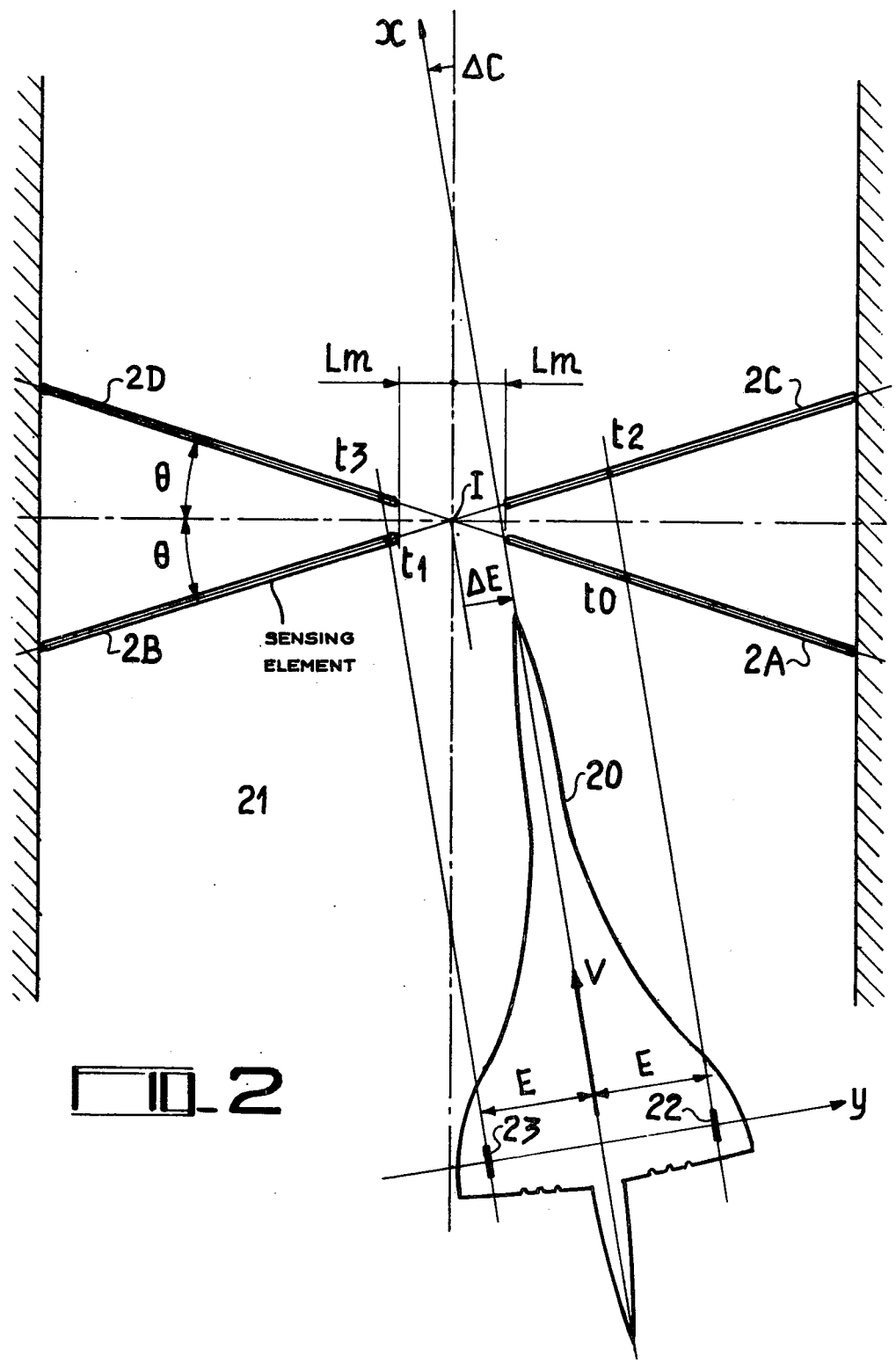
FIG. 2 is a diagram of a sensor arrangement.

Each sensor arrangement has a set of four linear elements 2A, 2B, 2C and 2D which may be arranged along two straight lines which are secant at a point I on the axis of the route, to produce an X pattern symetrical with respect to the axis shown in FIG. 2. Other kinds of pattern may be provided. Considering in particular, two of the four sensing elements of FIG. 2 located along a straight line having a direction perpendicular to the axis of the route, a second pattern is thus given by considering the pair of elements 2A, 2B (or 2C, 2D) displaced on that direction; a third pattern may be obtained by displacement of the pair 2A, 2D (or 2B, 2C) on that direction.

Half ($\theta$) of the included angle between the arms (tubes) is made sufficiently great for the heading deviation $\Delta C$ to be small in comparison with $\theta$. By way of example, a value of the order of 20° is suitable for the application envisaged.

Towards the outside, the arms terminate at the edge of the route, runway, or taxiway and towards the center at a distance $L_m$ from the axis of the route. The value of Lm is made greater than the maximum deviation $\Delta E$ to be measured and less than half (E) the minimum center-to-center track of the wheels of the undercarriage of the aircraft and other vehicles envisaged.

An aircraft 20 is assumed to be moving along a route 21. The lateral wheels 22, 23 of the undercarriage will cross arms 2A, 2B, 2C, 2D at times $t_0$, $t_1$, $t_2$, $t_3$ respectively. These times bear a relationship to the value of the heading deviation $\Delta C$, the speed V and the lateral deviation $\Delta E$ of the aircraft.

The initial times of passage $t_0$, $t_1$, $t_2$, $t_3$ of the lateral wheels are detected as changes in pressure in tubes of flexible resilient material which form the arms. Each tube is plugged at one end and sealed off at the other end by a detecting device of the kind employing a resilient flexible diaphragm having an electrical contact or a magnetically or electrostatically influenced contact. These detector devices are not shown for reasons of simplicity.

The sensing arrangement is thus able to supply four signals, such as square-wave signals, when the lateral wheels of the moving vehicle 20 pass by. This information, in the form of electrical signals A, B, C, D, is made use of by calculation in order to deduce from it the useful parameters V, $\Delta C$, and $\Delta E$.

Figure 3:
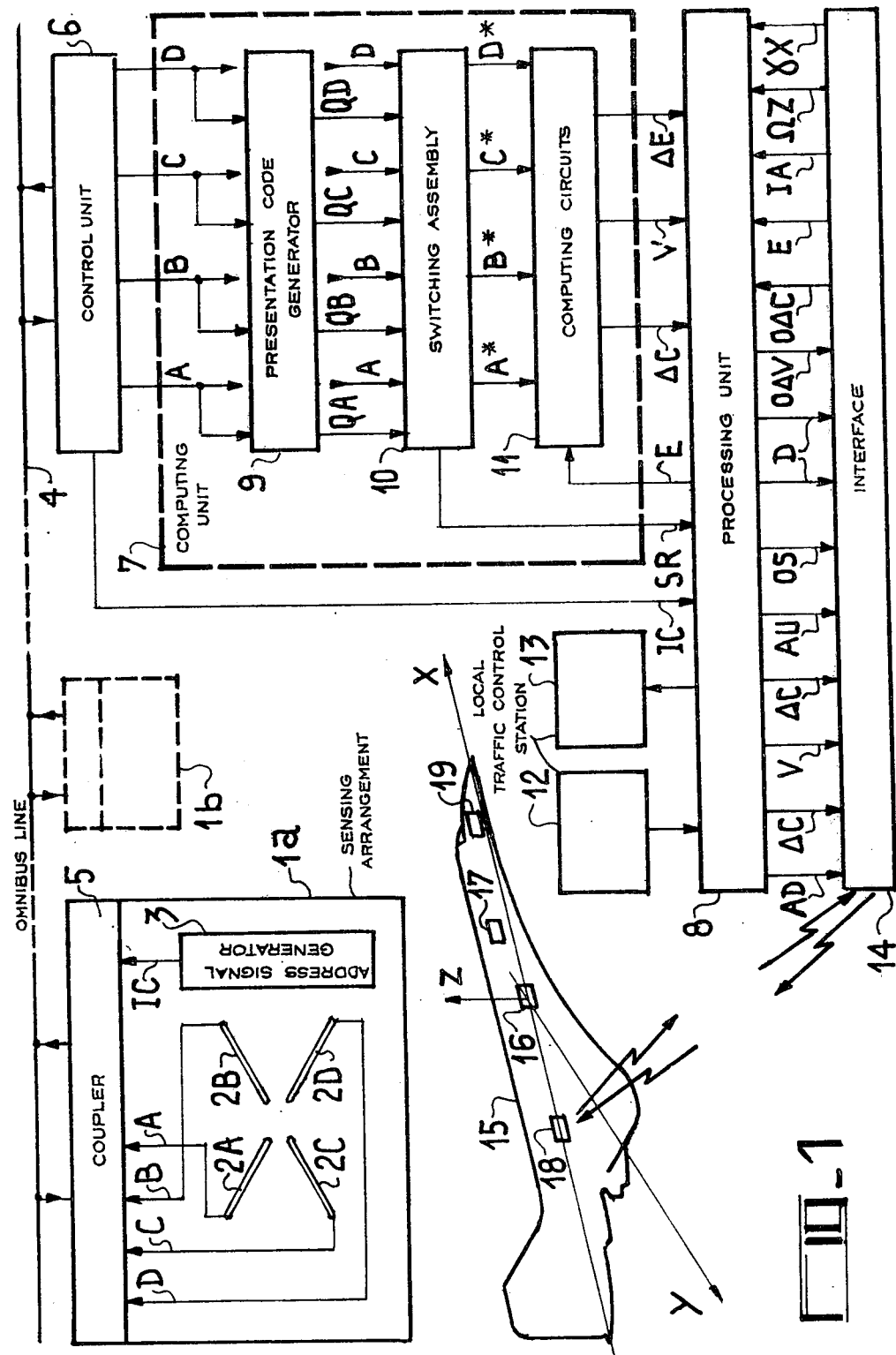
FIG. 3 is a diagram relating to the operation of the sensing arrangement.

The principle of calculation is as follows: referring to FIG. 3, the distances $\rho_1$ and $\rho_4$ indicated are given by the equations:

$$\rho_1 = (E - \Delta E) \tan(\theta + \Delta C)$$

$$\rho_2 = (E - \Delta E) \tan(\theta - \Delta C)$$

$$\rho_3 = (E + \Delta E) \tan(\theta + \Delta C)$$

$$\rho_4 = (E + \Delta E) \tan(\theta - \Delta C)$$

Also, taking the time origin $t_0 = 0$:

$$\rho_3 - \rho_2 = V t_1$$

$$\rho_3 + \rho_4 = V t_2$$

$$\rho_3 + \rho_1 = V t_3$$

whence:

$$\rho_1 + \rho_2 = V(t_3 - t_1)$$

$$\rho_4 + \rho_2 = V(t_2 - t_1)$$

If it is assumed that the heading deviation $\Delta C$ will usually be small, the following expressions, which are approximate in the case of V, $\Delta C$, can be extracted from the above equations after development and simplication:

$$V = \frac{4E \tan \theta}{t_2 + (t_3 - t_1)}$$

$$\Delta E = E \frac{t_2 - (t_3 - t_1)}{t_2 + (t_3 - t_1)}$$

$$\Delta C = \frac{\sin 2\theta}{4} \left[ \frac{t_3}{t_2 - t_1} - 1 \right]$$

These expressions show that the only variables to be measured are: $t_2$, $t_3$, $(t_2 - t_1)$ and $(t_3 - t_1)$, given that the angle $\theta$ is known, as also is the value E for the moving vehicle concerned.

Figure 4:
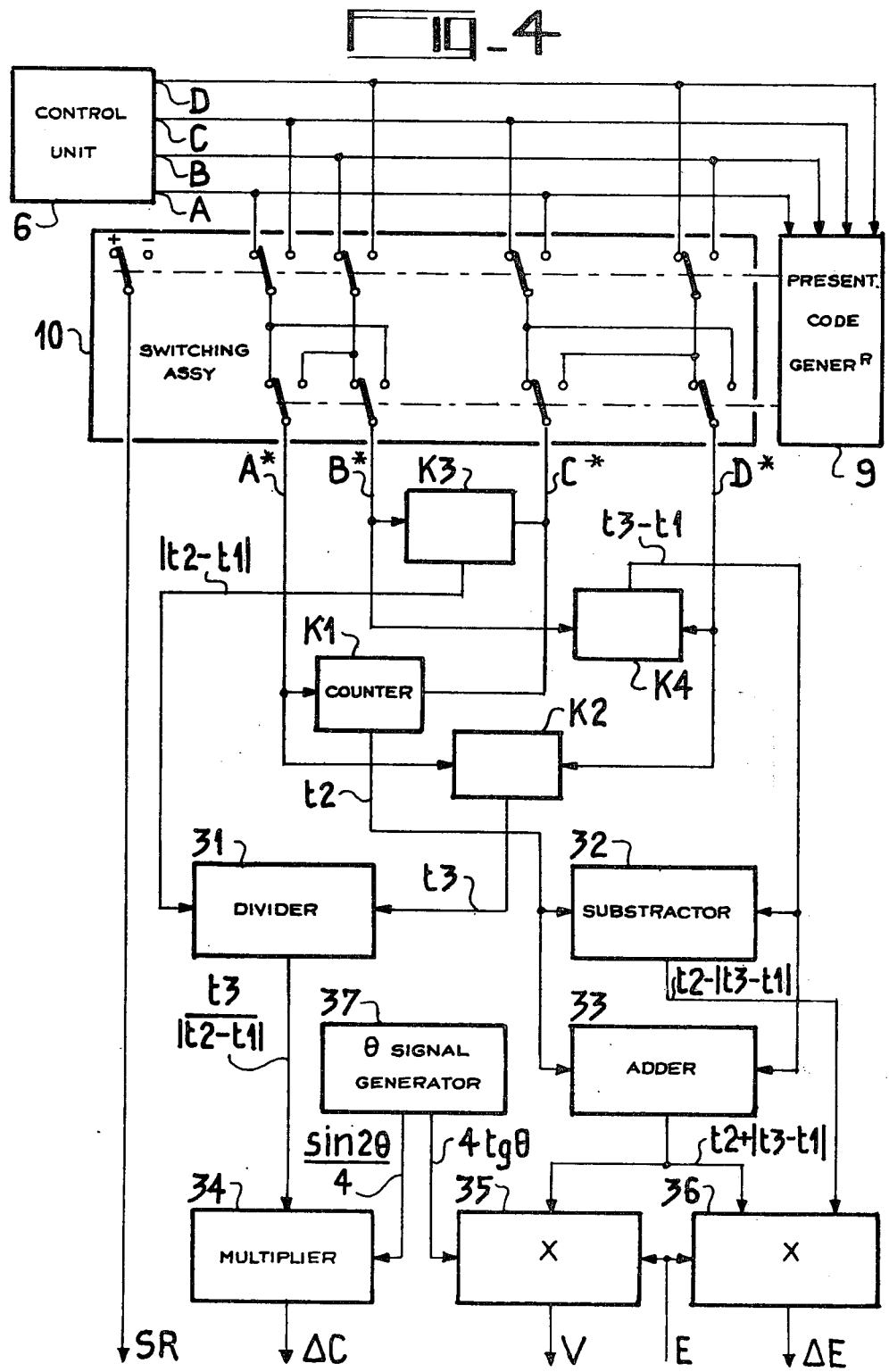
FIG. 4 is a functional diagram of the calculating and processing assembly.

The above formulae call for calculation using dividers, multipliers and adders as shown in the functional diagram of FIG. 4. The variables $t_2$, $t_3$, $(t_2 - t_1)$, $(t_3 - t_1)$ involved in the calculations are recorded in counters $K_1$ to $K_4$ which are originally set to zero and which are caused to start and stop by square-waves resulting from the signals A, B, C, and D which are obtained from the sensor concerned.

However, there is a need for the signals to be switched differently depending upon which is the first signal to arrive. The signals A, B, C, and D from the sensor arrive at the input side of a switching circuit 10 which is symbolised by two relays, which relays are operated by the circuit 9 in such a way that the output signals A*, B*, C*, D* follow on in time at respective times of $t_0$, $t_1$, $t_2$ and $t_3$. The positions of the relays correspond to the case shown in FIG. 3. The signal A* triggers the counters $K_1$ and $K_2$, which are stopped by signals C* and D* respectively. Assuming that $t_0 = 0$, counter $K_1$ supplies the information for $t_2$ and counter $K_2$ that for $t_3$. Counter $K_4$ is triggered by signal B* and stopped by D* to produce $t_3 - t_1$. Finally, counter $K_3$ is triggered by B* and stopped by C* or vice versa when $t_2$ occurs before $t_1$ in cases where movement is in the opposite direction, so that the difference $t_2 - t_1$ is positive for the calculation of $\Delta C$.

The direction of movement is produced for example in the form of a positive signal SR for a predetermined direction of movement along the route in question and in the form of a negative signal for movement in the opposite direction.

As dictated by the signal which arrives first at the input side, it is therefore necessary, by means of circuits 9 and 10, to perform the switching operations summarized in the table below:

| First signal at | A | B | C | D | Direction of movement SR |
|---|---|---|---|---|---|
| | MUST BE SWITCHED TO | | | | |
| A | A* | B* | C* | D* | + |
| B | B* | A* | D* | C* | + |
| C | C* | D* | A* | B* | − |
| D | D* | C* | B* | A* | − |

The counters have a start input, a stop input and an output for the result of the counting operation and they are fed by an ancillary clock circuit which is not shown. The other circuits shown consist of a divider 31, a subtractor 32, an adder 33 and multiplying circuits 34, 35 and 36. A circuit 37 produces the signals mentioned relating to the parameter $\theta$.

The operation of the switching circuits takes place in two stages. As dictated by the first signal to arrive, be it A or B or C or D, a presentation code is produced by the circuit 9 and then, as dictated by this code, the data switching circuit 10 is set and allows the various received signals A, B, C and D to pass through onto the lines A*, B*, C* and D* under the conditions stated above.

Figure 5:
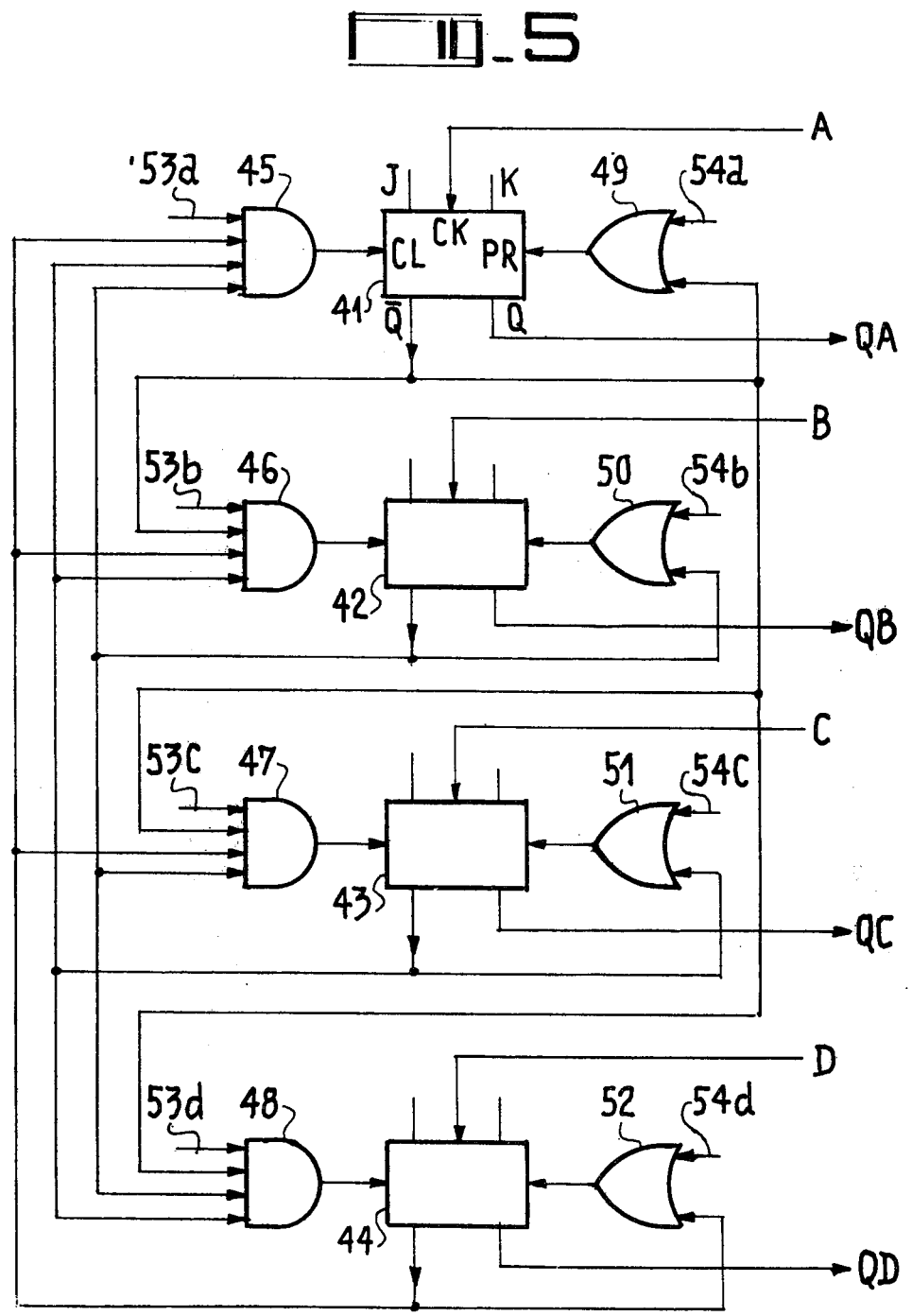
FIGS. 5 to 7 are diagrams of an embodiment of calculating unit forming part of the assembly shown in FIG. 4.

FIG. 5 shows an embodiment of the circuit 9 for generating the presentation code. The code is formed by the four binary outputs QA, QB, QC and QD taken in that order.

The presentation code is 0000 before the appearance of the first signal of a given series of four signals A, B, C and D. If, as in the circumstances shown in FIG. 3, the first signal appears at A, corresponding to arm 2A of the sensor, it is decided that the presentation code shall become 1000. In the other three cases provided for, namely the first signal being at B, C and D, i.e. arm 2B, 2C or 2D being affected first by the passage of the vehicle, the code is formed by 0100, 0010 and 0001 respectively.

To produce these four different states, the generating circuit may be formed by means of flip-flops of the JK type which are arranged in such a way that their Q outputs are equal to '0' when the corresponding clock input, formed by one of the signals A, B, C, or D is likewise in the '0' state. When the clock signal changes from "0" to "1", this transition triggers a changeover in the flip-flop and the Q output goes to the "1" state. In addition, by means of associated gate circuits, this "1" output causes the other flip-flops to be set to zero.

The JK flip-flops are referenced 41 to 44 and the J and K inputs are set to the 1 state. The setting or asynchronous inputs, which consist of the clear input CL and the preset input PR are controlled by means of four-input AND-gate circuits 45 to 48 and two-input OR-gate circuits 49 to 52, which are connected as shown. Resetting to a given state is controlled by the gate circuits via their inputs 53a to 53d and 54a to 54d so that the flip-flops 41 to 44 can be set to the requisite initial operating state. This resetting to a given state is brought about automatically by the control unit 6 before the signals A, B, C, D, are transmitted.

The flip-flops having been set to their initial state, when a signal arrives at A, B, C, or D the corresponding flip-flop changes over and blocks, giving at its output a useful signal $Q=1$. The fact that the $\overline{Q}$ output is 0 prevents the other flip-flops from changing over by resetting their CL outputs to "0". The Q outputs are marked QA, QB, QC, and QD respectively and produce the code.

Figure 6:
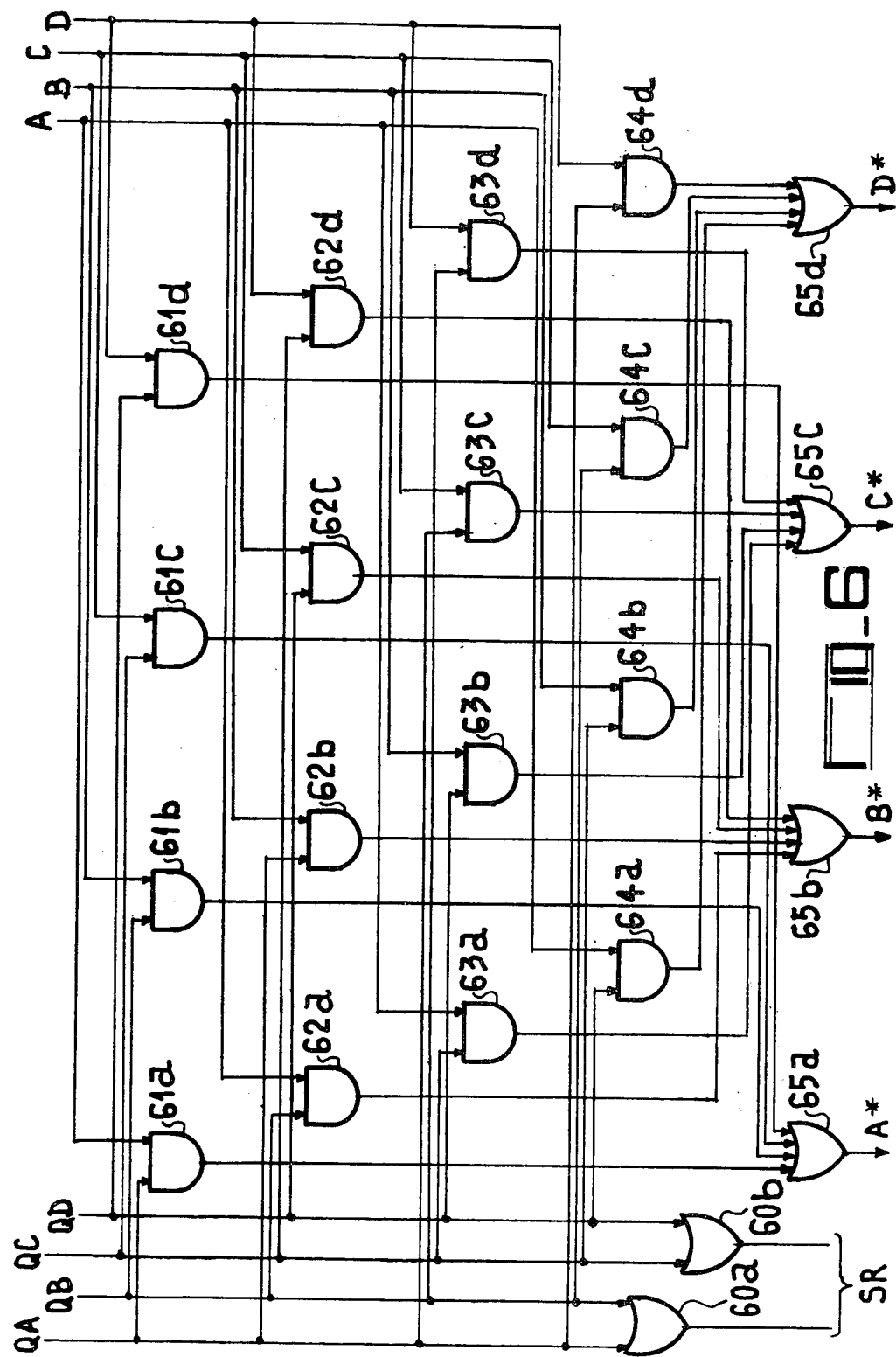
Figure 7:
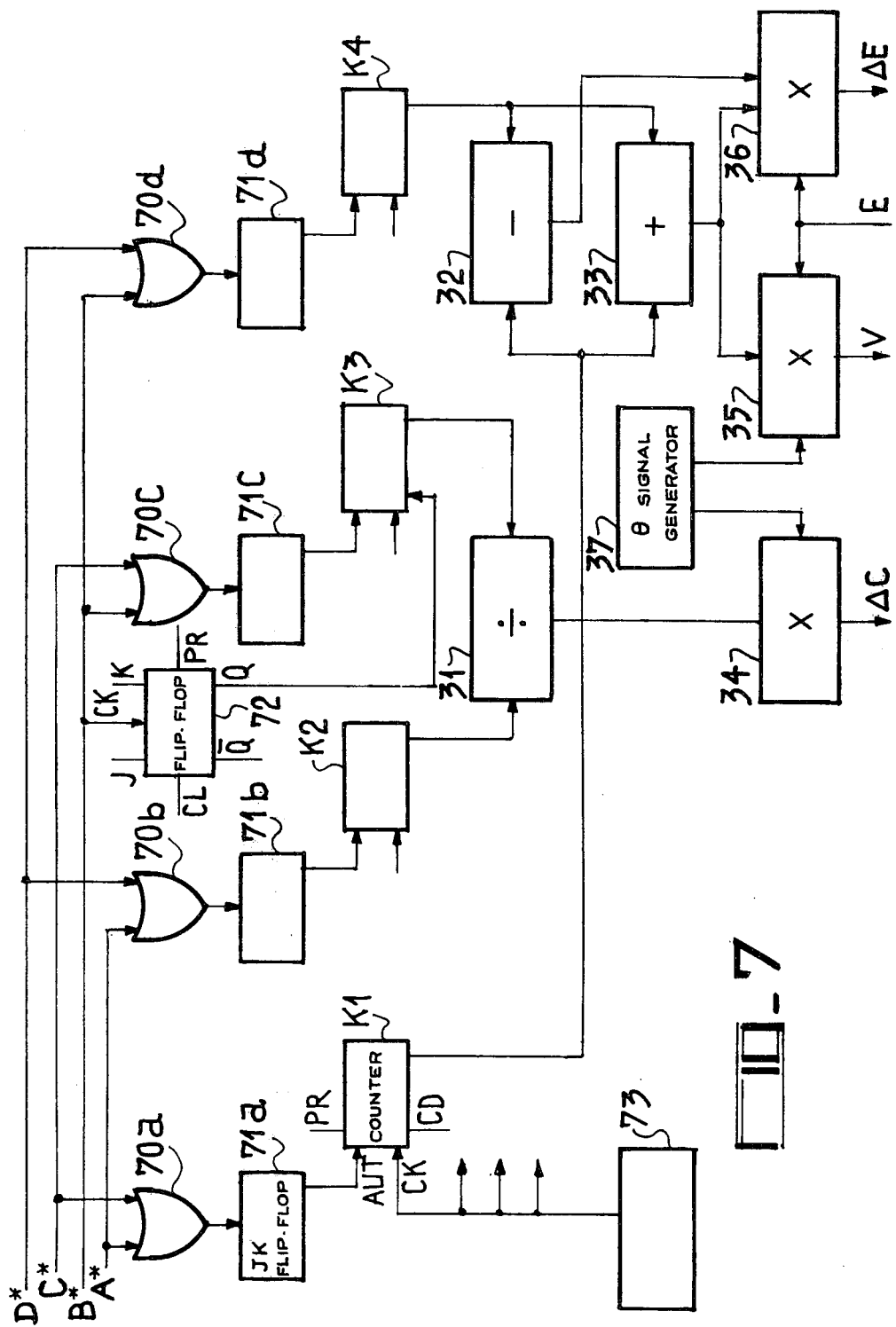

An embodiment of the data-switching circuit 10 is shown in the next figure, FIG. 6. The presentation code QA, QB, QC and QD is used to switch the pulses in accordance with the table given above. This is the purpose of the data-switching circuit, which may be formed from AND gate circuits and OR gate circuits as shown.

The direction of movement SR is given from two outputs by means of two OR circuits 60a and 60b and the presentation code. A "1" state at one of these outputs identifies the direction of movement of the vehicle concerned.

Switching to the outputs A*, B*, C*, D* is achieved by means of four sets of AND circuits 61a to 61d, 62a to 62d, 63a to 63d and 64a to 64d which, in each set, receive the signals A, B, C and D respectively from the control unit 6, the timing of which signals is the same as when detected by the sensor. The connections for presentation code on the other hand are different for each series as determined by the switching operations to be performed in the four cases shown in the above table. Thus, in the case envisaged in FIG. 3, where the presentation code is 1000, the direction of movement is given by the output of circuit 60a and only the AND gates 61a, 62b, 63c and 64d are operated in turn on reception of signals A, B, C, and D at successive times which correspond to the original spacing out of the times of detection $t_0$, $t_1$, $t_2$ and $t_3$. This does indeed produce, in this instance, switching via OR circuits 65a to 65d to the outputs A*, B*, C* and D*.

The signals A, B, C, and D having been switched to the channels A*, B*, C* and D* by means of circuits 9 and 10, the movement variables ΔC, V and ΔE are calculated by a calculating circuit 11 of which FIG. 7 shows an embodiment.

The circuit includes JK flip-flops and OR gates to start or stop counting by counters K1 to K4. The counters are started and stopped by the flip-flops and gates in such a way that counter K1 gives a value for the time $t_2 - t_0$, i.e. $t_2$ bearing in mind that $t_0$ is assumed to be equal to 0, K2 similarly gives a value for time $t_3$, counter K3 gives a value for the time $t_2 - t_1$ when $t_2$ is greater than $t_1$ and for $t_1 - t_2$ in the opposite case, and counter K4 gives a value for the time $t_3 - t_1$.

Each counter is controlled by means of an OR circuit 70a to 70d in series with a JK flip-flop circuit 71a to 71d. In addition, an extra flip-flop circuit 72 is provided to control the counting of K3 in accordance with the sign of $t_2 - t_1$.

The flip-flops 71a to 71d and 72 are of the kind already described (FIG. 5, circuits 41 to 44), details being repeated on the block 72 which has a clock input CK, JK inputs (in the "1" state), a clear input CL (connected from the 0 state to the 1 state), a preset input PR (in the "1" state), and Q and $\overline{Q}$ outputs. The Q outputs of the flip-flops 71a to 71d control respective counters via their AUT inputs (shown on block K1). A clock circuit 73 feeds the appropriate inputs CK of the counters, which also have a preset input PR (connected from the 0 state to the 1 state) and a backward counting control input CD. By means of its Q output, flip-flop circuit 72 controls the CD input of counter K3.

The OR circuits 70a to 70d have two inputs which are fed with respective pairs of the input signals A*, B*, C* and D* as shown. It can thus be seen that, if for example, the combination 70a and 71a is considered, that the Q output of the flip-flop goes to the 1 state and triggers counter K1 at time $t_0$ (arrival of signal A*) and then goes to the 0 state and causes it to stop counting at time $t_2$ (arrival of signal C*). The result of the count thus represents the time $t_2 - t_0$. In the case of the combination 70c, 71c and 72 the counter K3 produces a forward count $t_2 - t_1$ or a corresponding backward count depending upon whether the sign of this difference is positive or negative.

The outputs of counters K1 to K4 are applied to the assembly of adding, subtracting, dividing and multiplying circuits 31 to 36 already mentioned to allow the equations corresponding to parameters ΔC, V and ΔE to be worked out. Circuit 37 produces the signals involved in the equations which involve the constant sensor parameter θ.

The parameters which are calculated, namely the heading deviation ΔC, the lateral deviation ΔE, and the speed V together with its sign given by SR, as well as the signal IC for identifying the sensor which is obtained by address decoding, are fed to the processing unit 8 which is designed to associate these signals with the corresponding moving vehicle with the help of other incoming data from the moving vehicle (E, IA) and from the member 12 (FIG. 1, runway and parking area allotment).

Processing these signals at once allows the distance between two moving vehicles following one another along the same route to be monitored, or the collision margin between two moving vehicles on routes which intersect to be monitored, and speed-change instructions OΔV to be generated. These instructions are generated with allowance made for the speeds of the moving vehicles concerned and for other factors such as the time which a moving vehicle is away from an alloted turn-off and, possibly, the turning radius on the turn-off ordered.

In addition, a heading-change order OΔC, of the form OΔC = f(ΔC,ΔE) for example where f is a predetermined function, is produced by the processing unit 8 for each moving vehicle.

The orders OΔV and OΔC are displayed on board on a head-up or head-down arrangement 19. The presentation may also include the display of a heading order residue ΔOΔC which is calculated from the heading deviation ΔC and the roll (turn) rate ΩZ, of a speed order residue ΔOΔV which is calculated from the speed deviation V and the longitudinal acceleration Γx, and of emergency stop orders AU, turn-off orders SO and the information on distance to obstacles DO, distance to taxiway DB, and distance to intersection DC.

FIG. 8 is a general summary of these possibilities, which are given simply as examples since, for any intended application, the requisite orders and information and their formulation and presentation must be designed to suit the needs of the case.

According to the foregoing description, a ground movement and traffic controlling system according to the invention, by virtue of sensing arrangements of simple design, allows the parameters ΔC, ±V and ΔE significant for movement easily to be calculated and hence additional instructions to be generated with a view to regulating and controlling the traffic. The special design of the sensor does in fact enable the aforesaid parameters to be calculated by means of equations in which the only variables are the successive times at which the passage of the vehicle over the arms of the sensor is detected. The connecting means between the sensors and the calculating circuits, which encompass the address generating members 3 and the sensor coupling members 5, the omnibus line 4 and the control unit 6, have not been described in detail and are assumed to be produced by known techniques. The problem which is solved by these connecting means is in fact to transmit to the calculating circuits 7 the signals detected by each of the sensors. The transmissions are therefore ones which are delayed in time. By way of example, the coupling circuits 5 may, for this purpose, include digital circuits for measuring the successive time intervals between signals and a memory, in order to produce the appropriate data when interrogated from the control unit 6. At the control unit 6 the transmission line 4 is a single line but it is understood that this line branches in order to connect the sensors on the various routes which exist and that connecting means at route intersections are provided accordingly.

What is claimed is:

1. A system for controlling ground movement on airfields comprising: on the ground, sensors for detecting pressure variations and which are distributed at known intervals along the routes of movement, each sensor comprising four linear elements forming four arms disposed two by two on both sides of the axis of the route for producing four items of data A, B, C, D corresponding to the respective times at which the lateral wheels of a vehicle pass across the said arms; calculating means for calculating, from the said items of data, parameters which represent the angular deviation ΔC of the heading of the vehicle and the lateral deviation ΔE of the vehicle from the axis of the route of movement, and its speed V of movement and the sign SR thereof; means for transmitting the said items of data from one sensor at a time to the calculating means; processing and transmitter/receiver means for generating, from the said parameters and from vehicle identification data IA, E, operating signals for ground display and ground control of the traffic; and on board and vehicles, transmitter/receivers and display means for transmitting the said identification data and for receiving operating signals to display.

2. A control system according to claim 1, wherein the said elements of a sensor are arranged in pairs symmetrically to the axis of the route, each arm forming the same angle $\theta$ of predetermined size with a direction perpendicular to the route and extending from one lateral edge of the route to a common predetermined distance from the axis of the route.

3. A control system according to claim 2, wherein sensing element comprise a closed tube of flexible resilient material with detecting means at a terminal to produce an electrical signal when there is a change in pressure in the tube.

4. A control system according to claim 3, wherein the said calculating means perform calculation representing the equations $$\Delta C = \frac{\sin 2\theta}{4} \left[ \frac{t3}{t2 - t1} - 1 \right]$$

$$\Delta E = \frac{t2 - (t3 - t1)}{t2 + (t3 - t1)}$$

$$V = \frac{4E \tan \theta}{t2 + (t3 - t1)}$$

which define the said parameters and in which E is half the centre-to-centre track of the lateral wheels of a given vehicle and t1, t2, t3, are the successive intervals of time between the first instant when passage is detected and the following three instants at which passage is detected.

5. A control system according to claim 1 wherein the calculating means include a circuit for generating a presentation code QA, QB, QC, QD, from the said items of data from a sensor, a switching circuit which produces from the said presentation code and the said data signals A*, B*, C*, D*, corresponding to the said times of detection, and a circuit for calculating the said parameters ΔC, ΔE, and V from the said signals, the said switching circuit providing further the information on the direction of movement SR.

6. A control system according to claim 5, wherein the said processing means receive from the control unit the sensor-identifying data IC, from the calculating unit signals corresponding to the said parameters SR, ΔC, ΔE, V, from each vehicle to be monitored its identity IA and data E on half the track of its wheels, and from an ancillary ground station data on route and parking area allotments for the said vehicles, and in that they include means for producing data for the ground display of the traffic and the display on board the said vehicles of the said parameters and orders relating to ground movements.

* * * * *